(12) United States Patent
Pataille

(10) Patent No.: US 6,513,810 B1
(45) Date of Patent: Feb. 4, 2003

(54) SEALING RING

(75) Inventor: Gilbert Pataille, Corlee (FR)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/539,649

(22) Filed: Mar. 30, 2000

(30) Foreign Application Priority Data

Apr. 1, 1999 (DE) .......................................... 199 14 921

(51) Int. Cl.[7] .............................. F16J 15/32; F16J 15/08
(52) U.S. Cl. ..................... 277/549; 277/561; 277/560; 277/650; 277/944; 277/945; 277/946
(58) Field of Search ................................ 277/549, 559, 277/569, 570, 944, 945, 946, 568

(56) References Cited

U.S. PATENT DOCUMENTS

| | | | | |
|---|---|---|---|---|
| 4,243,235 A | * | 1/1981 | Repella | |
| 4,526,383 A | * | 7/1985 | Fuchs et al. | |
| 4,596,394 A | * | 6/1986 | Schmitt | |
| 4,623,153 A | * | 11/1986 | Nagasawa | |
| 5,615,894 A | * | 4/1997 | Vom Schemm | |
| 5,860,656 A | * | 1/1999 | Obata et al. | |
| 6,079,715 A | * | 7/2000 | Johnen et al. | |
| 6,164,660 A | * | 12/2000 | Goodman | |

FOREIGN PATENT DOCUMENTS

DE                33 09 538          9/1984

* cited by examiner

Primary Examiner—Anthony Knight
Assistant Examiner—Vishal Patel
(74) Attorney, Agent, or Firm—Kenyon & Kenyon

(57) ABSTRACT

A sealing ring, including a support ring made of an impact-resistant material, and a lip ring made of PTFE, where the lip ring has a holding segment and a sealing segment, and where the holding segment is connected with the support ring by an intermediate layer made of a polymer material. The holding segment and the sealing segment are made of two different PTFE compounds, each adapted to their purpose of use.

7 Claims, 1 Drawing Sheet

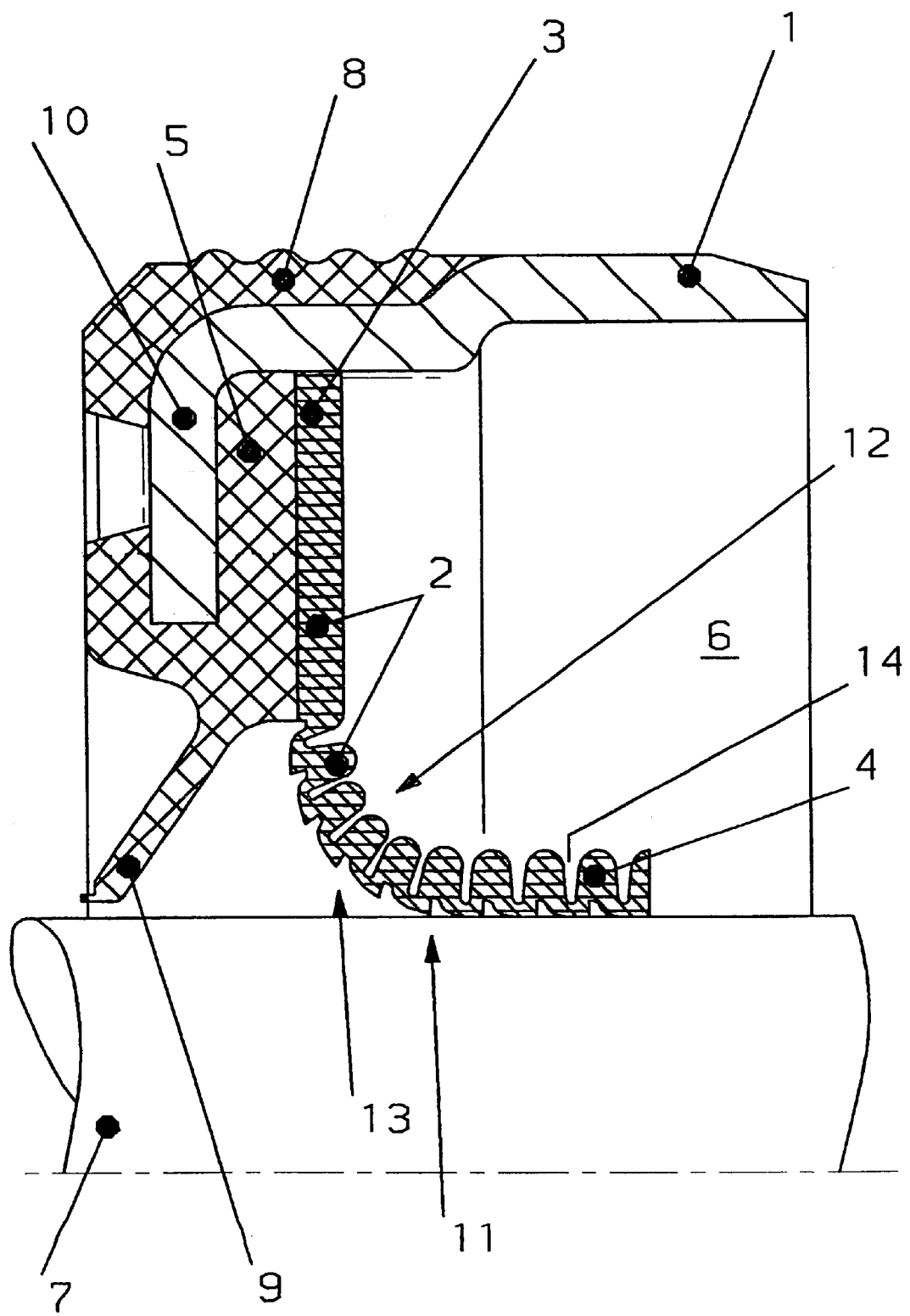

SEALING RING

FIELD OF TECHNOLOGY

The invention relates to a sealing ring, including a support ring made of an impact-resistant material, and a lip ring made of PTFE, where the lip ring has a holding segment and a sealing segment, and where the holding segment is connected with the support ring by an intermediate layer made of a polymer material.

RELATED ART

Such a sealing ring is known from German Patent 33 09 538 C2. The sealing ring is intended for rotating shafts or for rods that move back and forth, where the holding segment and the sealing segment of the lip ring are made of the same material. The entire lip ring is made of the same PTFE material.

SUMMARY OF THE INVENTION

The invention is directed to further development of sealing ring of the type noted above, in such a way that its manufacture is simplified, and the sealing ring demonstrates better properties in use, for a longer period of use.

To accomplish the task, it is provided that the holding segment and the sealing segment are made of two different PTFE compounds, each adapted to their purpose of use. Preferably, the holding segment is made of PTFE and/or fluorothermoplastics, such as PFA or FEP, and the sealing segment is made of PTFE or a PTFE compound. The material for the holding segment is aimed at the static conditions, and guarantees a good and durable bond with the polymer intermediate layer. The bond can be produced, for example, by gluing the holding segment and the intermediate layer together.

According to another embodiment, it is possible to mold the lip ring onto the intermediate layer during vulcanization of the polymer, under pressure and heat, in the molding die. A durable bond between the holding segment and the vulcanized intermediate layer results from mechanical-thermal bonding.

The holding segment can be clamped between a radial shank and an angled ring.

The sealing segment performs tasks that are completely different from those of the holding segment. In contrast to creating the most durable bond possible between the holding segment and the support ring, the sealing segment must ensure a perfect seal for the medium to be sealed in/out, over a long period of use. If the sealing segment is made of PTFE or a PTFE compound, it will demonstrate both a high level of temperature resistance and a high level of media resistance, with little friction. In addition, the sealing segment is very elastic in the radial direction, in order to follow deviations in concentricity and center offset of the shaft to be sealed, without lifting up from the surface to be sealed. Even under such extreme conditions, leakage is reliably prevented.

In addition, the sealing segment demonstrates a high level of wear resistance. In general, the advantage of a PTFE sealing ring made of two different materials for the holding segment and the sealing segment is that each material can be optimally adapted to its purpose of use, but nevertheless, the holding segment and the sealing segment are formed in one piece, one making a transition into the other.

To seal rotating shafts, the lip ring is arched forward axially in the direction of the space to be sealed, radially on the inside, and surrounds the shaft to be sealed with its sealing region, forming a seal.

The intermediate layer, at a thickness of at least 0.5 mm, can have a Shore A hardness of 65 to 85, preferably 70 to 80, where the ratio between the expanse of the intermediate layer in the radial direction and the related thickness is 3 to 10. Preferably, the intermediate layer has a thickness from 0.7 to 3 mm.

By structuring the intermediate layer in this way, the lip ring is able to follow radial movements of the component to be sealed, without being damaged or coming loose from the intermediate layer.

BRIEF DESCRIPTION OF THE DRAWING

An exemplary embodiment of a sealing ring according to the invention will be explained in greater detail below, using the drawing, which shows an embodiment of the invention in cross-sections.

DETAILED DESCRIPTION OF THE INVENTION

The drawing shows a sealing ring that is structured as a radial shaft sealing ring and essentially includes a support ring 1, a lip ring 2, and an intermediate layer 5. Support ring 1, in this exemplary embodiment, is made of a metallic material, lip ring 2 of two PTFE materials or two PTFE compound materials, and intermediate layer 5 of an elastomer or polymer material that is also used for static seal 8. In addition, preliminary seal 9 is connected in one piece with and made of the same material as static seal 8, where static seal 8 and preliminary seal 9 are bonded to support ring 1 by vulcanization. Preliminary seal 9 is arranged on the side of lip ring 2 that faces away from space 6 that is to be sealed, and is structured with elastomer lips, as in known seals.

On the side of radial shank 10 of support ring 1 that faces towards space 6 that is to be sealed, intermediate layer 5 is connected with holding segment 3 of lip ring 2. The radial expanse of holding segment 3 preferably corresponds to the radial expanse of intermediate layer 5. Radially on the inside, sealing segment 4 follows holding segment 3, where holding segment 3 and sealing segment 4 are made of two different PTFEs or PTFE compounds, each adapted to their own purpose of use. In the exemplary embodiment shown here, holding segment 3 is made of a PTFE compound. Sealing segment 4, in contrast, is made of a different PTFE compound.

In this exemplary embodiment, intermediate layer 5 is 2.5 mm thick and has a Shore A hardness of 75. Holding segment 3 is connected with radial shank 10 of support ring 1 only by intermediate layer 5, which not only ensures a permanent bond between the two parts, but also guarantees a good seal in the transition zone, as well as particularly good resilience of the sealing lip when radial displacements of shaft 7, which is to be sealed, occur. In this exemplary embodiment, sealing segment 4 is provided with a first and a second surface profiling 11, 12, where the first surface profiling 11, which faces shaft 7, has sawtooth-shaped recesses 13 that extend from the axially arched region of sealing segment 4 to intermediate layer 5, and therefore all the way to holding segment 3. Between each of sawtooth-shaped recesses 13, on the side facing away from shaft 7, a recess 14 is provided that is essentially U-shaped and open radially towards the outside, thereby forming the second surface profiling 12. Both surface profilings 11, 12 are each structured in a screw thread shape in the circumference direction.

Because the holding segment is made of a different PTFE compound from sealing segment 4, the memory effect that is peculiar to PTFE can be reinforced, in order to guarantee a perfect seal of space 6 that is to be sealed. Sealing segment 4 has the tendency to slowly change shape back to its original, disk-shaped form, with this tendency being maintained over the long term and helping to ensure sufficient pressure of sealing segment 4 against the surface of shaft 7 that is to be sealed, over the entire period of use. In this connection, it is not necessary to take into consideration any need for good adhesion between the sealing segment PTFE compound and intermediate layer 5, and neither is it necessary to take into consideration good sealing behavior of the holding segment PTFE compound. The materials of holding segment 3 and sealing segment 4 are each optimally adapted to their tasks.

What is claimed is:

1. A sealing ring that seals a space from a shaft, comprising:
   a support ring made of an impact-resistant material and having a radial portion;
   a lip ring made of polytetrafluoroethylene, the lip ring comprising a holding segment made of a first polytetrafluoroethylene compound selected for use in the holding segment, and a sealing segment made of a second polytetrafluoroethylene compound different from the first and selected for use in the sealing segment, the sealing segment bent toward the space to be sealed and does not include an opposite portion bent away from the space to be sealed, the holding segment and the sealing segment being formed in one piece;
   the holding segment being connected with the support ring by an intermediate layer made of a polymer material having a Shore A hardness of 65 to 85, and, bonded to the support ring and radial portion thereof,
   a static seal having an elongated protuberance contiguous with and made of the same material as the static seal or the intermediate layer, extending radially from the static seal in the direction of the shaft to be sealed and constituting a preliminary seal against the shaft to be sealed.

2. The sealing ring according to claim 1, wherein the holding segment and the sealing segment are each made of polytetrafluoroethylene and fillers.

3. The sealing ring according to claim 2, wherein the fillers of holding segment and sealing segment are different from one another.

4. The sealing ring according to claim 1, wherein the lip ring is arched axially in the direction of the space to be sealed and surrounds the shaft to be sealed with the sealing segment thereof, whereby the sealing segment forms a seal.

5. The sealing ring according to claim 1, wherein the intermediate layer has thickness of at least 0.5 mm and wherein the ratio between the expanse of the intermediate layer in the radial direction and the related thickness is 3 to 5.

6. The sealing ring according to claim 3, wherein the intermediate layer has thickness of at least 0.5 mm and wherein the ratio between the expanse of the intermediate layer in the radial direction and the related thickness is 3 to 5.

7. The sealing ring according to claim 5, wherein the intermediate layer has a thickness from 0.7 to 3 mm.

* * * * *